Figure 1:
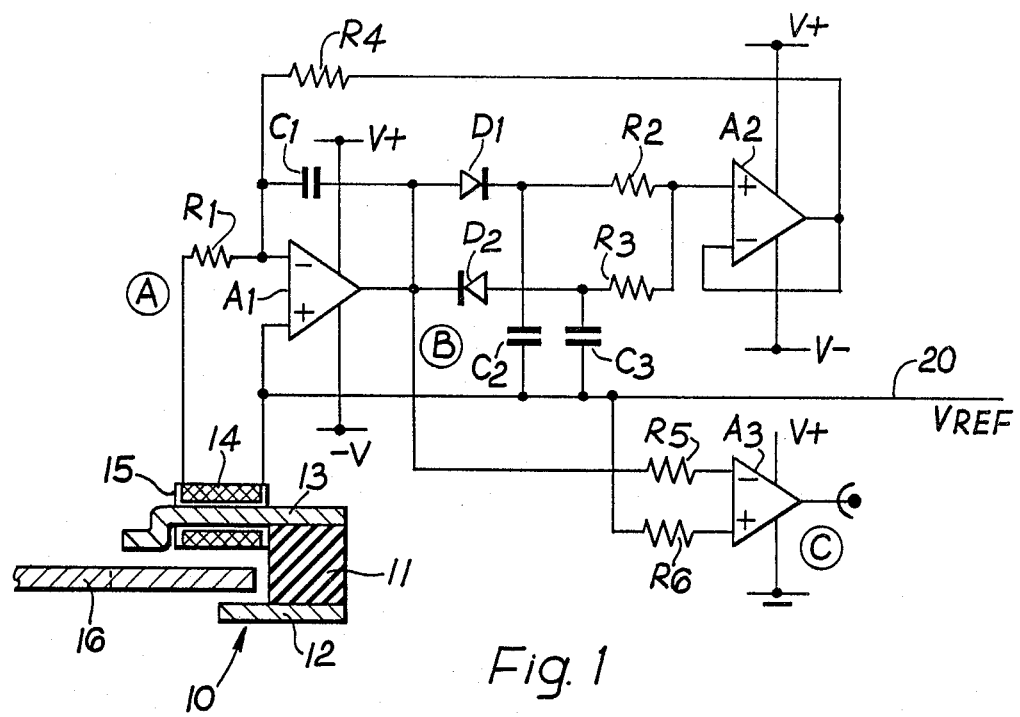

United States Patent [19]

Smith

[11] 4,424,550
[45] Jan. 3, 1984

[54] ELECTROMAGNETIC TRANSDUCER

[75] Inventor: Gerald B. Smith, Birmingham, England

[73] Assignee: Lucas Industries Limited, Birmingham, England

[21] Appl. No.: 280,526

[22] Filed: Jul. 6, 1981

[30] Foreign Application Priority Data

Jul. 19, 1980 [GB] United Kingdom ............... 8023676

[51] Int. Cl.³ ............................................. F02P 5/06
[52] U.S. Cl. ..................................... 361/236; 123/406
[58] Field of Search ............... 361/236, 243; 123/406, 123/414, 494; 324/391, 392

[56] References Cited

U.S. PATENT DOCUMENTS 4,255,778  3/1981  Breckel ............................ 361/236
4,267,470  5/1981  Kawakami et al. ............. 123/414 X

OTHER PUBLICATIONS

"Shaft Angle Transducer Giving Controllable Firing Advance"-Byrne: Proceedings of the International Conference on Electrical Machines, Brussels, Belgium, Sep. 11-13, 1978.

Primary Examiner—Harry E. Moose, Jr.
Attorney, Agent, or Firm—Trexler, Bushnell & Wolters, Ltd.

[57] ABSTRACT

A variable reluctance transducer includes a C-shaped assembly defining a magnetic circuit, one limb of the C being longer than the other. The assembly is arranged with its limbs on opposite sides of a movable member. A winding linked to the magnetic circuit is connected to a discriminating circuit including an integrator having a variable bias circuit which ensures that the peaks of the integrator output are in a predetermined relationship to a reference voltage. A comparator compares the integrator output with the reference voltage.

7 Claims, 4 Drawing Figures

ELECTROMAGNETIC TRANSDUCER

This invention relates to an electromagnetic transducer of the kind known as a variable reluctance transducer comprising a source of magnetic flux and a pick-up winding linked with said source so as to produce electrical output signals in response to the movement of a relatively movable member of magnetic material adjacent said source. The edge or periphery of the relatively movable member is shaped (with teeth or otherwise) so that the reluctance of the magnetic circuit changes according to whether or not an air gap therein is bridged (or partially bridged) by a tooth or other projecting portion of the relatively movable member.

With transducers of the above-mentioned kind the magnitude of the electrical output signals of the pick-up winding depends on the speed of movement of the relatively movable member relative to the transducer, and this makes the use of a transducer of this kind difficult to use in a situation where it is required to detect when the relatively movable member is in a precise position.

It is one object of the present invention to provide a transducer of the kind specified in which precise position detection is facilitated.

In accordance with one aspect of the invention, there is provided a transducer of the kind specified which includes a discriminating circuit comprising an active integrating circuit connected to said winding and providing an output signal dependent on the integral of the signal produced by said winding, a variable bias circuit for the integrator which is sensitive to the output of the integrator and biases the input to the integrator so that the positive and negative excursions of the integrator output have a desired relationship to a reference voltage level and a voltage comparator connected to compare the integrator output with said reference voltage level.

In one arrangement the variable bias circuit comprises positive and negative peak detector circuits connected to the output of the integrator and means which combines the signals stored in the peak detectors and varies the integrator bias to maintain the positive and negative peak values in said desired relationship.

In another form of the invention the variable bias means comprises a biasing resistor connected to cause the integrator output to drift in a specific polarity direction to a limit level so that the maximum excursion of the integrator output in one polarity direction is said limit level.

With this arrangement a single peak detector circuit can be used to store the peak level of the excursion of the integrator circuit in the opposite direction, the reference voltage level being a predetermined fraction of the signal stored in said peak detector circuit.

It is another object of the invention to provide a transducer of the kind specified in a compact and efficient form.

In accordance with another aspect of the invention, therefore, there is provided a transducer of the kind specified in which the magnetic circuit is defined by a C-shaped assembly arranged so that the limbs of the C lie on opposite sides of the relatively movable member in a plane substantially perpendicular to the direction of movement of said member.

Preferably the two limbs of the C-shaped assembly are of different lengths.

Figure 2:
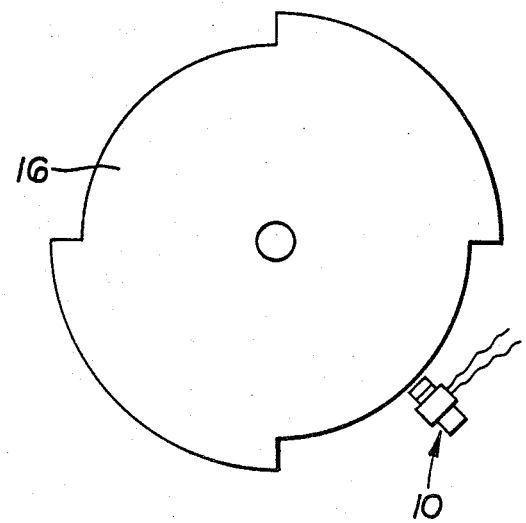
Figure 3:
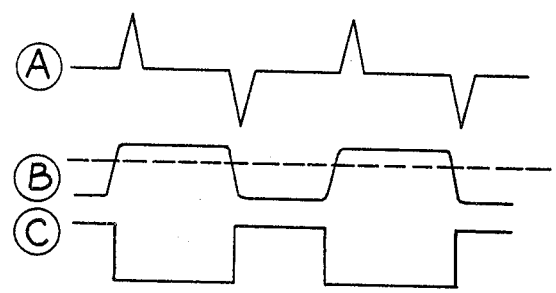
Figure 4:
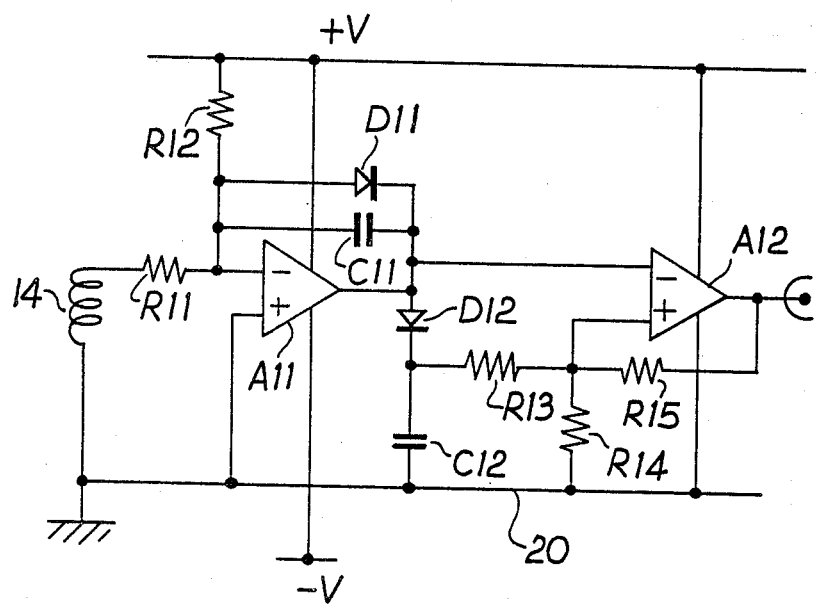

An example of the invention is shown in the accompanying drawings in which:

FIG. 1 is a diagrammatic cross-sectional view of the transducer combined with an electric circuit diagram of the associated discriminating circuit, FIG. 2 is an elevation on a reduced scale showing the relationship between the transducer and the relatively movable member, FIG. 3 shows waveforms at three points in FIG. 1, and FIG. 4 is a circuit diagram showing another embodiment of the discriminating circuit.

Referring to the drawings, the transducer 10 comprises a C-shaped assembly made up of a permanent magnet 11 formed of Alnico V and two mild steel plates 12, 13 attached to opposite ends of the magnet and forming the limbs of the C. The plate 13 is longer than the plate 12 and carries a pick-up winding 14 on a suitable spool 15, the end of the plate 13 being joggled to retain the spool. The two limbs of the C lie on opposite sides of the plate of a rotatable mild steel disc 16 so that the C lies in a plane substantially perpendicular to the direction of movement of the disc 16 relative to the transducer.

As will be seen from FIG. 2 the edge of the disc is cut away to provide four quadrants, an opposite pair of which are of larger radius than the other pair. The difference in radius is such that the edges of the larger quadrants can lie in the air gap between the limbs of the C, whereas the smaller quadrants do not reach the longer limb formed by plate 13.

As shown in FIG. 3 the winding 14 produces pulses of alternately opposite polarity as the disc rotates, i.e. a pulse of one polarity as the marginal edge of each larger quadrant passes into the gap in the C and an opposite polarity pulse as the marginal edge passes out again. The peak voltage of these pulses increases as the speed increases, but the duration of the pulses decreases.

The winding 14 of the transducer is connected at one end to a reference voltage rail 20 and at the other end by a resistor R1 to the inverting input of an operational amplifier A1 having a capacitor C1 connected between its output and inverting input terminals, and its non-inverting input connected to the rail 20, so that it operates as an active integrator. The output terminal of the amplifier A1 is connected to the anode and cathode respectively of two diodes D1 and D2 forming, in combination with two capacitors C2 and C3 connected between the other terminals of these diodes and the rail 20, positive and negative peak detector circuits. Two equal resistors R2 and R3 are connected in series between the cathode of diode D1 and the anode of diode D2, the junction of these resistors being connected to the non-inverting input of an operational amplifier A2 connected as a voltage follower and having its output terminal connected by a resistor R4 to the inverting input of the amplifier A1. A voltage comparator A3 has one input connected by a resistor R5 to the output of the amplifier A1 and its other input connected by a resistor R6 to the rail 20.

The effect of the peak detectors, the resistors R2 and R3 the amplifier A2 and the resistor R4 is to apply to the inverting input of the integrator amplifier A1 a variable bias current such that the magnitudes of the opposite peaks of the integrator output are maintained in the same, i.e. the integrator output is kept symmetrical with respect to the reference voltage. Although the magnitude of the pulses from the winding 14 varies with speed, the output of the integrator is approximately constant so that the timing of the "zero-crossings" detected by the comparator A2 remains constant. The variable bias referred to ensures that these zero crossings always occur at fixed positions of the disc 16 irrespective of its speed.

The use of a C-shaped assembly for the transducer, with the limbs of the C on opposite sides of the disc 16 provides the advantage over conventional transducers, where the gap in the core of the transducer faces one side of or the edge of the disc, that the effects of disc bearing wear causing axial displacement, eccentricity or inclination of the disc are cancelled out. The difference in length of the limbs of the C ensures that there are large changes in the reluctance of the magnetic circuit.

It will be noted that the size of the transducer 10 is small in relation to the diameter of the disc 16. This ensures that the pulses from the winding 14 are short compared with the spaces between them, assisting in providing great accuracy in detecting when the disc passes through its specific positions.

In the above described embodiment the variable biasing means utilizes two peak detectors. Alternatively an averaging circuit could be employed. In either case the time constants of the integrator should be long (e.g. twice as long) compared with the maximum period between transitions.

In the embodiment described, the relatively movable member is a disc which would, in use be attached to a rotating member, the rotation of which was to be detected for example the shaft of an engine, when the transducer is used in an ignition timing system. The invention could, however, equally be applied to a linear displacement, in which case the movable member would be a mild steel strip with teeth projecting into the air gap.

The circuit may also include means for inhibiting the output if the opposite peak values are not within a pre-set tolerance. This would operate at start up and prevent inaccurately timed outputs being produced.

In the alternative embodiment shown in FIG. 4 an operational amplifier A 11 has its non-inverting input connected to a ground rail 20 and its inverting input connected by a resistor R11 and the winding 14 in series to the ground rail and also by a capacitor C11 to its output terminal. A bias resistor R12 connects the inverting input of amplifier A11 to a positive supply rail and a diode D11 has its anode connected to the inverting input and its cathode connected to the output terminal of the amplifier A11.

The ohmic value of resistor R12 is significantly higher than that of resistor R11 and is chosen so as to provide a sufficient current into the "virtual earth" at the inverting input amplifier to overcome the input bias current of the amplifier and thereby to cause the output of amplifier A11 to drift negatively. The diode D11 limits this negative drift so that the output of amplifier A11 cannot fall significantly below earth rail level. As a result, when coil 14 is producing alternate negative-going and positive-going pluses, the output waveform will stabilise with the troughs of the output at the lower limit level of the amplifier A11 output and the peaks at a positive level which is substantially independent of the frequency of the pulses.

The output of amplifier A11 is connected to a peak-hold circuit consisting of a diode D12 and a capacitor C12, the diode D12 having its anode connected to the output of amplifier A11 and its cathode connected by the capacitor C12 to the earth rail 20. Two resistors R13 and R14 are connected in series across the capacitor C12 and their common point is connected to the non-inverting input of an operational amplifier A12 connected as a voltage comparator. The output of amplifier A11 is connected to the inverting input of amplifier A12 and a feedback resistor R15 is connected between the output and the non-inverting input of amplifier A12 to provide a relatively small amount of positive feedback to ensure clean switching of the amplifier A12 between its two output states.

The values of resistors R13 and R14 are chosen so that the reference voltage at their common point coincides with the voltage at the output of amplifier A11 when the peaks in the pulses from the winding 14 occur. If these pulses are symmetrical, then the output of amplifier A11 will be at half of its peak value when the pulse peaks occur. The resistors R13 and R14 should then be of equal value. If however, the pulses are assymmetrical, e.g. if the time taken for the pulse voltage to reach its peak is longer than that taken for the voltage to fall back to zero (which could occur with certain designs of transducer), then the amplifier A11 output at the instant of the pulse peak will be more than half its peak value. In this case resistor R14 will be chosen to have a higher ohmic value than resistor R13.

It will be appreciated that the rate of change of the output of amplifier A11 is greatest when the pulse peaks occur and that selecting the resistors R13, R14 to give switching of the amplifier A12 at the instants of these peaks ensures the least risk of the introduction of inaccuracy owing to noise.

Although shown as an amplifier of the type requiring a split-rail supply, amplifier A11 could be of the type which uses a simple single rail and earth return type of supply. In this case the diode D11 could be omitted because the construction of the amplifier is such that its output cannot fall below the earth rail voltage. Limitation of the output of amplifier A11 is then effected by saturation of the amplifier A11 output stage.

I claim:

1. An electromagnetic transducer comprising a source of magentic flux, pole means linked with said source to form a magnetic circuit, a winding linked with said magnetic circuit, a relatively movable member of magnetic material shaped so as to vary the reluctance of said magnetic circuit as it moves relative to said pole means, said winding producing electrical pulses of duration which is short relative to the intervening time interval of the relatively movable member moves relative to the pole means, said pulses being alternately of opposite polarity, and a discriminating circuit comprising an active integrating circuit connected to said winding and providing an output signal dependent on the integral of the signal produced by said winding, a variable bias circuit for the integrator which is sensitive to the output of the integrator and biases the input to the integrator so that the positive and negative excursions of the integrator output have a desired relationship to a reference voltage level and a voltage comparator connected to compare the integrator output with said reference voltage level.

2. A transducer as claimed in claim 1 in which the variable bias circuit comprises positive and negative peak detector circuits connected to the output of the integrator and means which combines the signals stored in the peak detectors and varies the integrator bias to maintain the positive and negative peak values in said desired relationship.

3. A transducer as claimed in claim 1 in which the variable bias means comprises a biasing resistor connected to cause the integrator output to drift in a specific polarity direction to a limit level so that the maximum excursion of the integrator output in one polarity direction is said limit level.

4. A transducer as claimed in claim 3 in which said biasing means includes a diode connecting the input of the integrator to its output to determine said limit level.

5. A transducer as claimed in claim 3 or claim 4, further comprising a single peak detector circuit connected to store the peak level of the excursion of the integrator circuit in the opposite direction, the reference voltage level being a predetermined fraction of the signal stored in said peak detector circuit.

6. An electromagnetic transducer as set forth in claim 1 wherein said magnetic circuit is defined by a C-shaped assembly arranged so that the limbs of the C lie on opposite sides of the relatively movable member in a plane substantially perpendicular to the direction of movement of said member.

7. A transducer as set forth in claim 6 wherein the C-shaped assembly has two limbs of different lengths.

* * * * *